US012609305B2

(12) United States Patent
Sato et al.

(10) Patent No.: US 12,609,305 B2
(45) **Date of Patent: \*Apr. 21, 2026**

(54) SECONDARY BATTERY

(71) Applicant: Panasonic Intellectual Property Management Co., Ltd., Osaka (JP)

(72) Inventors: Yosuke Sato, Osaka Fu (JP); Yusuke Saito, Osaka Fu (JP); Naoki Seki, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 749 days.

This patent is subject to a terminal disclaimer.

(21) Appl. No.: 17/914,518

(22) PCT Filed: Mar. 22, 2021

(86) PCT No.: PCT/JP2021/011755
§ 371 (c)(1),
(2) Date: Sep. 26, 2022

(87) PCT Pub. No.: WO2021/200343
PCT Pub. Date: Oct. 7, 2021

(65) Prior Publication Data
US 2023/0132836 A1 May 4, 2023

(30) Foreign Application Priority Data

Mar. 30, 2020 (JP) ................................. 2020-061377

(51) Int. Cl.
*H01M 4/485* (2010.01)
*H01M 4/02* (2006.01)
*H01M 4/38* (2006.01)

(52) U.S. Cl.
CPC ........... *H01M 4/485* (2013.01); *H01M 4/386* (2013.01); *H01M 2004/027* (2013.01)

(58) Field of Classification Search
CPC ................. H01M 4/485; H01M 4/386; H01M 2004/027; H01M 4/362; H01M 4/364;
(Continued)

(56) References Cited

U.S. PATENT DOCUMENTS

| 10,804,530 B2 * | 10/2020 | Mckinney | H01M 4/366 |
| 10,886,534 B2 * | 1/2021 | Minami | H01M 4/583 |

(Continued)

FOREIGN PATENT DOCUMENTS

| CN | 102820451 A | 12/2012 |
| CN | 103400971 A | 11/2013 |

(Continued)

OTHER PUBLICATIONS

International Search Report dated May 18, 2021, issued in counterpart Application No. PCT/JP2021/011755, with English translation. (5 pages).

(Continued)

*Primary Examiner* — Maria V Ewald
*Assistant Examiner* — Suhani Jitendra Patel
(74) *Attorney, Agent, or Firm* — WHDA, LLP

(57) ABSTRACT

A secondary battery including a positive electrode, a negative electrode, and an electrolyte. The negative electrode includes a carbon material, a first silicon-containing material, and a second silicon-containing material. The first silicon-containing material includes a silicate phase, and first silicon phases dispersed in the silicate phase. The second silicon-containing material includes a carbon phase, and second silicon phases dispersed in the carbon phase.

10 Claims, 2 Drawing Sheets

(58) Field of Classification Search
CPC ........ H01M 4/366; H01M 4/62; H01M 4/587;
Y02E 60/10
See application file for complete search history.

(56) References Cited

U.S. PATENT DOCUMENTS

| | | | |
|---|---|---|---|
| 12,062,779 B2 * | 8/2024 | Sakamoto | H01M 4/366 |
| 12,095,076 B2 * | 9/2024 | Sato | H01M 4/587 |
| 2012/0171560 A1 * | 7/2012 | Xu | H01M 4/5825 |
| | | | 429/188 |
| 2013/0052489 A1 | 2/2013 | Zhamu et al. | |
| 2013/0230769 A1 * | 9/2013 | Xu | H01M 4/136 |
| | | | 429/188 |
| 2015/0188127 A1 | 7/2015 | Niimi et al. | |
| 2015/0318542 A1 | 11/2015 | Morozumi et al. | |
| 2015/0380729 A1 * | 12/2015 | Kojima | H01M 4/5825 |
| | | | 429/223 |
| 2016/0372753 A1 | 12/2016 | Fukasawa et al. | |
| 2017/0214041 A1 | 7/2017 | Minami et al. | |
| 2017/0309950 A1 | 10/2017 | Minami et al. | |
| 2018/0040881 A1 | 2/2018 | Kusagawa et al. | |
| 2018/0069233 A1 | 3/2018 | Matus et al. | |
| 2018/0248222 A1 | 8/2018 | Iwama | |
| 2018/0287148 A1 | 10/2018 | Akira et al. | |
| 2018/0342757 A1 | 11/2018 | Choi et al. | |
| 2019/0006656 A1 | 1/2019 | Matsuno et al. | |
| 2019/0123353 A1 | 4/2019 | Hirose et al. | |
| 2019/0386341 A1 * | 12/2019 | Kazawa | H01M 4/133 |
| 2021/0104750 A1 | 4/2021 | Ito et al. | |
| 2021/0111395 A1 | 4/2021 | Shin et al. | |
| 2021/0218064 A1 | 7/2021 | Iida et al. | |
| 2021/0313564 A1 | 10/2021 | Nambuya et al. | |

FOREIGN PATENT DOCUMENTS

| | | |
|---|---|---|
| CN | 104347842 A | 2/2015 |
| JP | 2007-059213 A | 3/2007 |
| JP | 2008-152996 A | 7/2008 |
| JP | 2010-165471 A | 7/2010 |
| JP | 2010-238426 A | 10/2010 |
| JP | 2013-161705 A | 8/2013 |
| JP | 2013-178913 A | 9/2013 |
| JP | 2014-044899 A | 3/2014 |
| JP | 2014-071948 A | 4/2014 |
| JP | 2018-181539 A | 11/2018 |
| WO | 2015/145521 A1 | 10/2015 |
| WO | 2016/035290 A1 | 3/2016 |
| WO | 2016/147564 A1 | 9/2016 |
| WO | 2018/179817 A1 | 10/2018 |
| WO | 2019/230077 A1 | 12/2019 |
| WO | 2020/031869 A1 | 2/2020 |

OTHER PUBLICATIONS

Written Opinion dated May 18, 2021, issued in counterpart Application No. PCT/JP2021/011755. (3 pages).
Office Action dated Dec. 2, 2024, issued in counterpart Indian Application No. 202247060241. (5 pages).
Extended (Supplementary) European Search Report dated Mar. 11, 2024, issued in counterpart EP application No. 21780453.3. (5 pages).

* cited by examiner

SECONDARY BATTERY

CROSS-REFERENCE TO RELATED APPLICATION

This application is a National Phase Application filed under 35 U.S.C. § 371 of International Application No. PCT/JP2021/011755 filed on Mar. 22, 2021 which claims the benefit of priorities under 35 U.S.C. § 119(a) of Japanese Patent Application No. 2020-061377 filed in Japan on Mar. 30, 2020, the contents of which are incorporated herein by reference.

TECHNICAL FIELD

The present invention relates to a secondary battery.

BACKGROUND ART

In recent years, secondary batteries, such as non-aqueous electrolyte secondary batteries, because of their high voltage and high energy density, have been expected as promising power sources for small consumer applications, power storage devices, and electric cars. With increasing demand for a higher battery energy density, a material containing silicon (Si) that forms an alloy with lithium has been expected to be utilized as a negative electrode active material having a high theoretical capacity density.

Patent Literature 1 proposes a non-aqueous electrolyte secondary battery which includes a composite material including a lithium silicate phase represented by $Li_{2z}SiO_{2+z}$ where $0<z<2$, and silicon particles dispersed in the lithium silicate phase.

CITATION LIST

Patent Literature

[PTL 1] International publication WO2016/035290

SUMMARY OF INVENTION

Technical Problem

The silicon-containing material shows significant expansion and contraction due to charge and discharge, and when the silicon-containing material contracts, voids are likely to be formed therearound. Moreover, it may occur that the silicon-containing material cannot withstand stresses due to expansion and contraction, causing cracks in the silicon-containing material. As a result, with repeated charge-discharge cycles, the contact points between part of the silicon-containing material and its surrounding gradually decrease, and part of the silicon-containing material is isolated, and thus, the capacity decreases.

Solution to Problem

In view of the above, one aspect of the present invention relates to a secondary battery, including: a positive electrode; a negative electrode; and an electrolyte, wherein the negative electrode includes a carbon material, a first silicon-containing material, and a second silicon-containing material, the first silicon-containing material includes a silicate phase, and first silicon phases dispersed in the silicate phase, and the second silicon-containing material includes a carbon phase, and second silicon phases dispersed in the carbon phase.

Advantageous Effects of Invention

According to the present invention, the cycle characteristics of the secondary battery can be enhanced.

DESCRIPTION OF EMBODIMENTS

Figure 1:
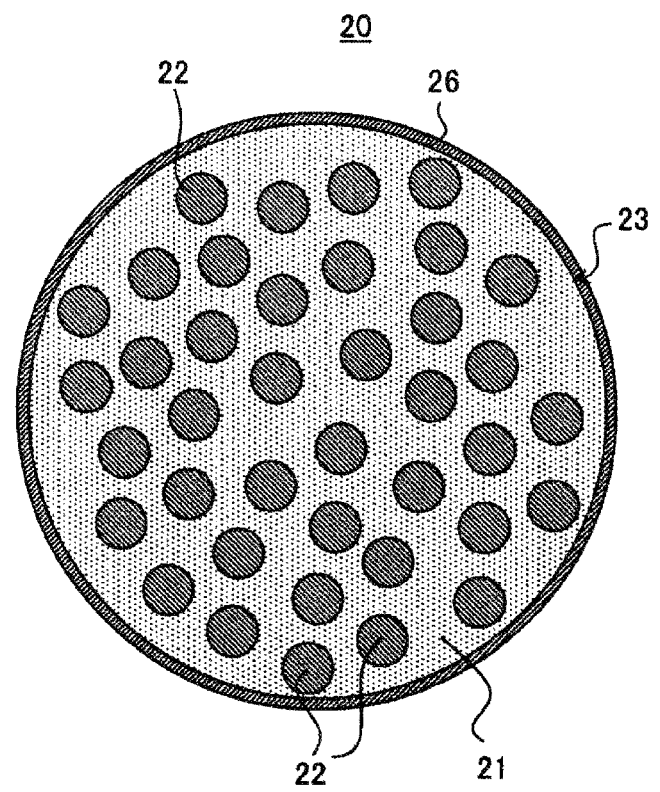
FIG. 1 A schematic cross-sectional view of a first silicon-containing material according to one embodiment of the present invention.

A secondary battery according to an embodiment to the present invention includes a positive electrode, a negative electrode, and an electrolyte (or liquid electrolyte). The negative electrode includes, as an active material, a carbon material (hereinafter sometimes referred to as a first carbon material), a first silicon-containing material, and a second silicon-containing material. The first silicon-containing material includes a silicate phase, and first silicon particles or silicon phases dispersed in the silicate phase. The second silicon-containing material includes a carbon phase, and second silicon particles or silicon phases dispersed in the carbon phase. Hereinafter, the silicon phases may be silicon particles, or may not be in the form of particles.

The first silicon-containing material and the second silicon-containing material each have a sea-island structure. The first or second silicon phases (islands) are dispersed in a matrix (sea) of the silicate phase or the carbon phase (hereinafter, the silicate phase and the carbon phase are collectively referred to as a lithium-ion conductive phase), and is covered with the lithium-ion conductive phase. In the sea-island structure, the contacts between the first or second silicon phases and the electrolyte are restricted, which can suppress side reactions. Furthermore, the stress caused by expansion and contraction of the silicon phases is relaxed by the matrix of the lithium-ion conductive phase.

The first silicon-containing material can contain a considerable amount of the first silicon phases while being scarce in the sites that capture lithium ions responsible for irreversible capacity, and is less likely to cause side reactions. The silicate phase of the first silicon-containing material, however, does not have electron conductivity. Therefore, when voids are formed around the first silicon-containing material due to the expansion and contraction during charge and discharge, or cracks occur in the first silicon-containing material due to the stress caused by expansion and contraction, part of the first silicon-containing material is isolated, and the contact points between part of the first silicon-containing material and its surrounding decrease, and as a result, the capacity tends to decrease.

In contrast, the second silicon-containing material includes a carbon phase and second silicon phases dispersed in the carbon phase. The carbon phase of the second silicon-containing material has electronic conductivity. Therefore, even when voids are formed around the second silicon-containing material or cracks occur in the first silicon-containing material, part of the second silicon-containing material is unlikely to be isolated, and the contact points between the second silicon-containing material and its surrounding can likely be maintained. Therefore, by partially replacing the first silicon-containing material with the second silicon-containing material, the contact points of the whole silicon-containing material with its surrounding tend to be maintained, and the decrease in capacity during repeated charge-discharge cycles tends to be suppressed.

The carbon phase can be constituted of, for example, formless carbon (i.e., amorphous carbon). The formless carbon may be, for example, hard carbon, soft carbon, or may be others. Formless carbon (amorphous carbon) generally refers to a carbon material having an average interplanar spacing d002 of the (002) plane as measured by X-ray diffractometry of exceeding 0.34 nm.

The first carbon material contained in the negative electrode as an active material is graphite, graphitizable carbon (soft carbon), non-graphitizable carbon (hard carbon) or the like, and may be a composite thereof. The carbon material may be used singly, or in combination of two or more kinds. In particular, preferred is graphite, in terms of its excellent stability during charge and discharge and small irreversible capacity. Graphite may constitute 50 mass % or more, further 80 mass % or more of the carbon material.

Graphite means a material with a developed graphite-like crystal structure, and generally refers to a carbon material having an average interplanar spacing d002 of the (002) plane as measured by X-ray diffractometry of 0.340 nm or less. For example, natural graphite, artificial graphite, and graphitized mesophase carbon particles are typical examples of graphite.

The ratio: B/A of a mass B of the second silicon-containing material to a mass A of the first silicon-containing material may satisfy $0.2 < B/A < 10$. Controlling of the B/A ratio is extremely important for improving the cycle characteristics of the secondary battery. By controlling the B/A ratio within the range of $0.2 < B/A < 10$, further within the range of $0.5 \leq B/A \leq 3$ or $0.5 \leq B/A \leq 2$, the cycle characteristics improvement effect by the second silicon-containing material containing a carbon phase and second silicon phases dispersed therein becomes remarkable. The second silicon-containing material is considered to enter the voids caused by shrinkage after the expansion of the first silicon-containing material and the voids formed by cracks having occurred in the first silicon-containing material, and thus to serve to maintain the electrical connection between the first silicon-containing material and its surrounding. For that, it is desirable that the second silicon-containing material is contained in the negative electrode in an amount that can sufficiently act on the whole first silicon-containing material contained in the negative electrode. The B/A ratio is desirably as close to 1 as possible, and may satisfy, for example, $0.8 \leq B/A \leq 1.2$.

The ratio of a total (A+B) of the mass A of the first silicon-containing material and the mass B of the second silicon-containing material, to a total (A+B+C) of the mass A of the first silicon-containing material, the mass B of the second silicon-containing material, and a mass C of the carbon material may be 5 mass % or more and 30 mass % or less, may be 5 mass % or more and 20 mass % or less, may be 5 mass % or more and 15 mass % or less, may be 5 mass % or more and 12 mass % or less, and may be 5 mass % or more and 10 mass % or less. With such a range, the expansion and contraction of the whole negative electrode can be controlled within a more suitable range, and the merit of high capacity obtained by the first and second silicon-containing materials can be maximized.

The relative values of the mass A, the mass B and the mass C respectively of the first silicon-containing material, the second silicon-containing material, and the first carbon material contained in the negative electrode can be each determined by cross-sectional SEM-EDX analysis. First, particles of the first silicon-containing material (particles A), particles of the second silicon-containing material (particles B), and particles of the first carbon material (particles C) are distinguished from each other. The observation magnification is desirably 2,000 to 20,000 times.

For cross-sectional SEM-EDX analysis, for example, the battery is disassembled, to take out the negative electrode, and obtain a cross section of the negative electrode using a cross section polisher (CP). The cross section of the negative electrode is observed with a scanning electron microscope (SEM). A cross-sectional backscattered electron image of the negative electrode is subjected to elemental mapping analysis by energy dispersive X-ray (EDX). Using an image analysis software, total areas A to C occupied by the particles A to C, respectively, are calculated. The area ratios among the total areas A to C may be regarded as the volume ratios among the particles A to C.

SEM-EDX analysis also allows for quantification of the elements in the particles A to C. From a cross-sectional backscattered electron image of the negative electrode, 10 particles are randomly selected for each of the particles A to C having a maximum diameter of 5 µm or more, and an elemental mapping analysis by energy dispersive X-ray (EDX) is performed on each particle. The area containing a target element is calculated using an image analysis software. The values of the area containing the predetermined element measured for 10 particles are averaged. The area is converted into the number of atoms, to calculate the composition. From the compositions of the particles A to C, the specific gravities of the particles A to C are determined, respectively. Next, using the total areas A to C and the specific gravities A to C, B/A and (A+B)/(A+B+C) are calculated.

The above analysis and a later-described analysis of the negative electrode are preferably performed using the negative electrode in a discharged state. In view of eliminating the influence of the decomposition products of the electrolyte, the sample to be analyzed is desirably of the negative electrode in the battery before charge-discharge cycles or in the early stage of the cycles.

In the process of charging and discharging, a surface film is formed on the silicon-containing material due to the decomposition of the electrolyte or other causes. Also, the silicon-containing material, in some cases, has a conductive layer at its surface. Therefore, the mapping analysis by EDX is performed on a region 1 µm or more inward from the peripheral edge of the cross section of the silicon-containing material so that the measurement range does not include the surface film or the conductive layer.

Desirable cross-sectional SEM-EDX analysis measurement conditions are shown below.

<SEM-EDX Measurement Conditions>

Processing apparatus: SM-09010 (Cross Section Polisher) available from JEOL

Processing conditions: accelerating voltage: 6 kV

Current value: 140 µA

Degree of vacuum: $1 \cdot 10^{-3}$ to $2 \cdot 10^{-3}$ Pa

Measuring apparatus: Electron microscope SU-70 available from HITACHI

Acceleration voltage during analysis: 10 kV

Field: Free mode

Probe current mode: Medium

Probe current range: High

Anode Ap.: 3

OBJ Ap.: 2

Analysis area: 1 μm square

Analysis software: EDAX Genesis

CPS: 20,500

Lsec: 50

Time constant: 3.2

An average particle diameter Da of the first silicon-containing material may be 2 μm or more and 15 μm or less, may be 3 μm or more and 12 μm or less, and may be 5 μm or more and 10 μm or less. With such a range, voids that may occur due to expansion and contraction of the first silicon-containing material can be appropriately suppressed, and cracks in the first silicon-containing material that may occur as a result of expansion and contraction can also be likely suppressed.

An average particle diameter Db of the second silicon-containing material may be 3 μm or more and 18 μm or less, may be 6 μm or more and 15 μm or less, and may be 8 μm or more and 12 μm or less. With such a range, even though cracks occur in the second silicon-containing material, part of the second silicon-containing material tends to enter the voids caused by shrinkage after expansion or cracks of the first silicon-containing material, and the effect of maintaining the electrical connection between the first silicon-containing material and its surrounding can be remarkable.

The average particle diameter Da or Db of the first or second silicon-containing material is measured by observing a cross section of the negative electrode mixture layer using a SEM or TEM. Specifically, the maximum diameters of any 100 particles of the first or second silicon-containing material are measured and averaged.

When the first and second silicon-containing particles can be separated, the volume-based particle size distributions of the first and second silicon-containing materials are each measured using a laser diffraction particle diameter distribution analyzer, and the particle diameters at 50% cumulative volume may be regarded as the average particle diameters Da and Db.

The content of the first silicon phases in the first silicon-containing material is, for example, 30 mass % or more and 80 mass % or less, and may be 40 mass % or more (or 50 mass % or more) and 70 mass % or less. With such a range, a sufficiently higher capacity of the negative electrode can be achieved. In addition, side effects due to expansion and contraction of the first silicon phases can be restricted, and the cycle characteristics also tend to be improved. This is because while the first silicon-containing material contains a sufficient amount of the first silicon phases, the ratio of the silicate phase in the first silicon-containing material does not become too small. With a considerable ratio of the silicate phase being maintained, the contact between the first silicon phases and the electrolyte is remarkably restricted, and side reactions are also remarkably suppressed. Also, the stress caused by expansion and contraction of the first silicon phases is easily relaxed by the matrix of the silicate phase.

The content of the second silicon phases in the second silicon-containing material is, for example, 30 mass % or more and 80 mass % or less, and may be 40 mass % or more and 70 mass % or less. With such a range, as in the case of the first silicon-containing material, a sufficiently higher capacity of the negative electrode can be achieved, and the cycle characteristics tend to be improved. Furthermore, with a considerable ratio of the carbon phase being maintained, the carbon phase can easily enter the voids that are later formed as a result of charge and discharge, and for example, the electrical connection between the first silicon-containing material and its surrounding tends to be maintained.

An average particle diameter Dc of the first carbon material contained as an active material in the negative electrode, desirably, is larger than the average particle diameters Da and Db and is 13 μm or more and 25 μm or less. With such a range, voids tend to be formed between relatively large particles of the first carbon material, and the first and second silicon-containing materials tend to be contained in the voids. This makes it easy to increase the packing ratio of the active material in the negative electrode, and thus to obtain a negative electrode with a higher capacity. Furthermore, the first and second silicon-containing materials present in the voids contribute to maintain the electronic contact between the particles of the first carbon material. On the other hand, even when the first and second silicon-containing materials present in the voids expand and contract, the expansion and contraction of the whole negative electrode are unlikely to occur, leading to less occurrence of the deterioration due to charge-discharge cycles.

The average particle diameter Dc of the first carbon material is measured by observing a cross section of the negative electrode mixture layer using a SEM or TEM. Specifically, the maximum diameters of any 100 particles of the first carbon material are measured and averaged.

When the first carbon material can be separated, the volume-based particle size distribution of the first carbon material is measured using a laser diffraction particle diameter distribution analyzer, and the particle diameter at 50% cumulative volume may be regarded as the average particle diameter Dc.

The average particle diameter of the first silicon phases may be, for example, 1 nm or more. The average particle diameter of the first silicon phases may be 1000 nm or less, may be 500 nm or less, may be 200 nm or less, and may be 100 nm or less (further, 50 nm or less). The finer the first silicon phases are, the smaller the changes in volume of the first silicon-containing material during charge and discharge are, leading to improved structural stability of the first silicon-containing material.

The average particle diameter of the second silicon phases may be, for example, 1 nm or more. The average particle diameter of the second silicon phases may be 1000 nm or less, may be 500 nm or less, may be 200 nm or less, and may be 100 nm or less (further, 50 nm or less). The finer the second silicon phases are, the smaller the changes in volume of the second silicon-containing material during charge and discharge are, leading to improved structural stability of the second silicon-containing material. The amount of side reactions of the second silicon-containing material is larger than that of the first silicon-containing material. Therefore, the average particle diameter of the second silicon phases is desirably larger than that of the first silicon phases, and may be, for example, 1.1 to 2 times as large as that of the first silicon phases. By setting the average particle diameter of the second silicon phases to be slightly larger, the contact area with the liquid electrolyte can be reduced, and the amount of side reactions can be reduced.

The average particle diameter of the first or second silicon phases is measured by observing a cross section of the first or second silicon-containing material using a SEM or TEM. Specifically, the maximum diameters of any 100 particles of the first or second silicon phases are measured and averaged.

The crystallite size of the first or second silicon phases is preferably 30 nm or less. When the crystallite size is 30 nm or less, the amount of volume change of the first or second silicon-containing material due to expansion and contraction of the first or second silicon phases associated with charge and discharge can be further reduced. The crystallite size is more preferably 30 nm or less, still more preferably 20 nm or less. When the crystallite size is 20 nm or less, the expansion and contraction of the first or second silicon phases are uniformalized, and microcracks in the first or second silicon phases are reduced, leading to further improved cycle characteristics.

The crystallite size of the first or second silicon phases can be calculated from the Scherrer formula, using a half-width of a diffraction peak attributed to the Si (111) plane of an X-ray diffraction (XRD) pattern of the first or second silicon phases.

The silicate phase can contain at least one selected from the group consisting of an alkali metal element and a Group II element. By including such an element, the irreversible capacity of the silicate phase is more significantly reduced. Examples of the alkali metal element and the Group II element that can be used include Li, K, Na, Mg, Ca, Sr, and Ba.

The silicate phase may further contain an element M other than alkali metal elements and Group II elements. The element M can be, for example, at least one selected from the group consisting of B, Al, Zr, Nb, Ta, La, Y, Ti, P, Bi, Zn, Sn, Pb, Sb, Co, Er, F, and W.

The silicate phase preferably includes a lithium silicate phase that has a small irreversible capacity and is excellent in charge and discharge efficiency in the early stage. Lithium silicate is lightweight and has excellent lithium ion conductivity. The lithium silicate may be an oxide phase containing Li, Si and O, and may contain another element. The atomic ratio: O/Si of O to Si in the lithium silicate phase is, for example, greater than 2 and less than 4. Preferably, the O/Si is greater than 2 and less than 3. The atomic ratio: Li/Si of Li to Si in the lithium silicate phase is, for example, greater than 0 and less than 4.

The lithium silicate phase preferably contains a lithium silicate represented by a formula: $Li_{2z}SiO_{2+z}$ where $0<z<2$. The symbol z preferably satisfies $0<z<1$, more preferably $z=\frac{1}{2}$ (i.e., $Li_2Si_2O_5$).

The composition of the silicate phase can be analyzed in the following manner. The composition analysis is desirably performed using the first silicon-containing material or the negative electrode mixture layer in a discharged state. In view of eliminating the influence of the decomposition products of the electrolyte, the sample to be analyzed is desirably of the first silicon-containing material in the battery before charge-discharge cycles or in the early stage of the cycles.

The contents of B, Na, K, and Al in the silicate layer can be determined, for example, by a quantitative analysis in accordance with JIS R3105 (1995) (analysis method for borosilicate glass). The Ca content can be determined by a quantitative analysis in accordance with JIS R3101 (1995) (analysis method of soda-lime glass).

The content of each element contained in the silicon-containing material can be measured, for example, by inductively coupled plasma atomic emission spectroscopy (ICP-AES). Specifically, a sample of the first silicon-containing material is completely dissolved in a heated acid solution, and the residue of dissolution, carbon, is removed by filtration. Then, the obtained filtrate is analyzed by ICP-AES, to measure a spectral intensity of the each element. Subsequently, using a commercially available standard solution of the each element, a calibration curve is drawn, from which the content of the each element is calculated.

When analyzing the composition of the silicate phase, the first and second silicon-containing materials may be taken out from the battery, for example, in the following manner. Specifically, the battery is disassembled, to take out the negative electrode, which is then washed with anhydrous ethyl methyl carbonate or dimethyl carbonate to remove the electrolyte therefrom. Next, the negative electrode mixture layer is peeled off from the negative electrode current collector, and pulverized in a mortar, to obtain a sample powder. Next, the sample powder is dried in a dry atmosphere for 1 hour, and then immersed in a lightly-boiled 6M hydrochloric acid for 10 minutes, to remove alkali metals, such as Na and Li, that may have been contained in the binder and the like. Next, the sample powder is washed with ion-exchanged water, followed by separation by filtration, and then by drying at 200° C. for 1 hour.

In the first silicon-containing material, a silicate phase, silicon oxide phases, the first silicon phases, and the like can be present. By using Si-NMR, these can be distinguished from each other and quantified. The Si content obtained by ICP-AES as described above is the sum of the amount of Si constituting the first silicon phases, the amount of Si in the silicate phase, and the amount of Si in the silicon oxide phases. On the other hand, the amount of Si constituting the silicon phases and the amount of Si in the silicon oxide phases can be determined separately using Si-NMR. Therefore, the amount of Si in the silicate phase can be determined by subtracting the amount of Si constituting the silicon particles and the amount of Si in the silicon oxide phases, from the Si content obtained by ICP-AES. For a standard substance necessary for quantification, a mixture containing a silicate whose Si content is already known and silicon particles in a predetermined ratio is used.

Desirable Si-NMR measurement conditions are shown below.

<Si-NMR Measurement Conditions>

Measuring apparatus: Solid nuclear magnetic resonance spectrometer (INOVA-400), available from Varian, Inc.

Probe: Varian 7 mm CPMAS-2

MAS: 4.2 kHz

MAS speed: 4 kHz

Pulse: DD (45° pulse+signal capture time 1H decoupling)

Repetition time: 1200 sec to 3000 sec

Observation width: 100 kHz

Observation center: around −100 ppm

Signal capture time: 0.05 sec

Accumulated number of times: 560

Sample amount: 207.6 mg

The quantification of each element in the first silicon-containing material can be done by SEM-EDX analysis, Auger electron spectroscopy (AES), laser ablation ICP mass spectrometry (LA-ICP-MS), X-ray photoelectron spectroscopy (XPS), or the like.

At least part of the surface of the first silicon-containing material may be coated with a conductive layer. By forming a conductive layer on the surface of the first silicon-containing material, the conductivity of the silicon-containing material can be dramatically increased. As the conductive material forming the conductive layer, a carbon material is preferred. The carbon material preferably includes at least one selected from the group consisting of a carbon compound and a carbonaceous material.

The thickness of the conductive layer is preferably thin enough not to substantially influence the average diameter of the first silicon-containing material. The conductive layer has a thickness of preferably 1 to 200 nm, more preferably 5 to 100 nm, for securing the electrical conductivity and allowing for diffusion of lithium ions. The thickness of the conductive layer can be measured by cross-section observation of the silicon-containing material using a SEM or TEM (transmission electron microscope).

As the carbon compound, for example, a compound containing carbon and hydrogen, and a compound containing carbon, hydrogen, and oxygen are exemplified. As the carbonaceous material, formless carbon with low crystallinity, graphite with high crystallinity, and the like can be used. Examples of the formless carbon include carbon black, coal, coke, charcoal, and activated carbon. Examples of the graphite include natural graphite, artificial graphite, and graphitized mesophase carbon particles. Preferred is formless carbon, in terms of its low hardness and excellent buffering effect against the silicon phases whose volume changes during charge and discharge. The formless carbon may be graphitizable carbon (soft carbon) or non-graphitizable carbon (hard carbon). Examples of the carbon black include acetylene black and Ketjen black.

A particle fracture strength Ma of the first silicon-containing material is, for example, 300 MPa<Ma<1000 MPa, and may be 300 MPa<Ma<800 MPa. A particle fracture strength Mb of the second silicon-containing material is, for example, 300 MPa<Mb<1000 MPa, and may be 300 MPa<Ma<800 MPa. The first and second silicon-containing materials having a particle fracture strength in the above range are hardly crushed during the electrode plate production process or during charge and discharge cycles, and are advantageous in suppressing the deterioration in cycle characteristics.

The particle fracture strength can be determined, for example, in the following manner. As the particle for measurement (the first or second silicon-containing material), a particle whose maximum particle diameter obtained in a photographed image is 5 $\mu$m or more and 20 $\mu$m or less is prepared. The particle is compressed with an indenter under a gradually increasing load. The load at which the particle fractures is defined as a particle fracture strength of the particle. The particle fracture strength can be measured using a commercially available micro-compression tester (e.g., MCT-211 available from Shimadzu Corporation). For example, using a flat indenter with a 50-$\mu$m-diameter tip, with the displacement rate set at 5 $\mu$m/sec, the particle fracture strengths of 10 particles are measured, and averaged.

The ratio: Mb/Ma of the particle fracture strength Mb of the second silicon-containing material to the particle fracture strength Ma of the first silicon-containing material may satisfy 0.5<Mb/Ma<2. In this case, one of the first and second silicon-containing materials is not extremely hard or extremely soft, relative to the other. Therefore, for example, during the compression in the electrode plate production process, the particles with high particle fracture strength are unlikely to crush the particles with low particle fracture strength, and the cycle characteristics hardly deteriorate. The closer the particle fracture strengths of the first and second silicon-containing materials are to each other, the more likely the effect of suppressing the deterioration in cycle characteristics is to be exhibited.

Next, an example of a method of producing a first silicon-containing material will be described in detail. Here, a description is given of a case where the first silicon phases are dispersed in the lithium silicate phase.

Step (i)

A raw material mixture containing a Si raw material and a Li raw material in a predetermined ratio is used as a starting material of lithium silicate. To the raw material mixture, the aforementioned alkali metal element, Group II element, and/or element M may be contained. The raw material mixture is allowed to melt, and the melt is passed between metal rolls and formed into flakes, to prepare lithium silicate. Then, the silicate flakes are heat-treated at a temperature equal to or higher than the glass transition point and lower than the melting point in an air atmosphere, so that the flakes are crystallized. Note that the silicate flakes can be used without being crystallized. Also, silicate can be produced, without allowing the raw material mixture to melt, by baking it at a temperature lower than the melting point, to proceed solid phase reaction.

For the Si raw material, silicon oxide can be used. For the Li raw material, for example, lithium carbonate, lithium oxide, lithium hydroxide, lithium hydride, and the like can be used. These may be used singly or in combination of two or more kinds. Examples of the raw materials of the alkali metal element, Group II element, and element M include oxides, hydroxides, carbonate compounds, hydrides, nitrates, and sulfates of each element.

Step (ii)

Next, the lithium silicate is blended with raw material silicon, to form a composite. For example, through the following steps (a) to (c), a first silicon-containing material composed of composite particles of lithium silicate and first silicon phases (hereinafter sometimes referred to as silicate composite particles) is produced.

Step (a)

Powder of raw material silicon and powder of the lithium silicate are mixed at a mass ratio of, for example, 20:80 to 95:5. For the raw material silicon, coarse particles of silicon of about several $\mu$m to several tens of $\mu$m in average particle diameter can be used.

Step (b)

Next, using a pulverizer like a ball mill, the mixture of the raw material silicon and the lithium silicate, while being refined, is pulverized and formed into a composite. At this time, the mixture may be added with an organic solvent, and wet-pulverized. The organic solvent serves to prevent an object to be pulverized from adhering to the inner wall of the pulverizer.

Examples of the organic solvent include alcohols, ethers, fatty acids, alkanes, cycloalkanes, silicate esters, and metal alkoxides.

The raw material silicon and the lithium silicate may be separately refined into fine particles, and then mixed. Without using a pulverizer, silicon nanoparticles and amorphous lithium silicate nanoparticles may be produced and mixed. For producing nanoparticles, any commonly known method, such as a gas phase method (e.g., plasma method) or a liquid phase method (e.g., liquid phase reduction method) can be used.

Step (c)

Next, the mixture is heated, for example, under pressure to 600° C. to 1000° C. in an inert gas atmosphere (e.g., an atmosphere of argon, nitrogen, etc.), to be sintered. For sintering, a sintering apparatus capable of applying pressure in an inert atmosphere, such as a hot press, can be used. During sintering, the silicate softens and flows so as to fill the gaps between the first silicon phases. As a result, a dense block-shaped sintered body including the silicate phase as the sea portion and the first silicon phases as the island portions can be obtained. By pulverizing the obtained sintered body, silicate composite particles can be obtained.

Step (iii)

Subsequently, at least part of the surface of the composite particles may be coated with an electrically conductive material, to form a conductive layer. Examples of the method for coating the surface of the composite particles with a conductive carbon material include: a CVD method using a hydrocarbon gas, such as acetylene and methane, as a raw material; and a method in which coal pitch, petroleum pitch, phenolic resin, or the like is mixed with the composite particles and heated at 700° C. to 950° C. in an inert atmosphere (e.g., an atmosphere of argon, nitrogen), to be carbonized. Carbon black may be allowed to adhere to the surface of the composite particles.

Step (iv)

A step of washing the composite particles (including when having a conductive layer at the surface) with an acid may be performed. For example, by washing the composite particles with an acidic aqueous solution, a very small amount of alkaline component that may occur when the raw material silicon and lithium silicate are formed into a composite can be dissolved and removed. Examples of the acidic aqueous solution include: an aqueous solution of an inorganic acid, such as hydrochloric acid, hydrofluoric acid, sulfuric acid, nitric acid, phosphoric acid, and carbonic acid; and an aqueous solution of an organic acid, such as citric acid and acetic acid.

FIG. 1 schematically illustrates a cross section of a silicate composite particle 20 coated with a conductive layer, as an example of the first silicon-containing material.

A silicate composite particle (base particle) 23 includes a lithium silicate phase 21, and silicon phases 22 dispersed in the lithium silicate phase 21. The silicate composite particle (base particle) 23 has a sea-island structure in which the fine silicon phases 22 are dispersed in a matrix of the lithium silicate phase 21. The surface of the silicate composite particle (base particle) 23 is coated with a conductive layer 26.

In the lithium silicate phase 21, silicon oxide phases (not shown) can be dispersed. The $SiO_2$ content in the silicate composite particle (base particle) 23 as measured by Si-NMR is preferably, for example, 30 mass % or less, more preferably less than 7 mass %.

The silicate composite particle (base particle) 23 may contain another component, in addition to the above components. For example, a carbon material, an oxide such as $ZrO_2$, and a reinforcing material such as a carbide may be contained in an amount of less than 10 mass %, relative to the base particle 23.

Next, examples of a method of producing a second silicon-containing material will be described.

(i) First Method

Raw material silicon and a carbon source are mixed, and using a pulverizer like a ball mill, the mixture of the raw material silicon and the carbon source, while being refined, is pulverized and formed into a composite. The mixture may be added with an organic solvent, and wet-pulverized. At this time, the raw material silicon is finely pulverized, to form second silicon phases. The second silicon phases are dispersed in a matrix of the carbon source.

Examples of the carbon source that can be used include, but are not limited to, water-soluble resins, such as carboxymethyl cellulose (CMC), hydroxyethyl cellulose, polyacrylates, polyacrylamide, polyvinyl alcohol, polyethylene oxide, and polyvinylpyrrolidone, saccharides, such as cellulose and sucrose, petroleum pitch, coal pitch, and tar.

Examples of the organic solvent that can be used include alcohols, ethers, fatty acids, alkanes, cycloalkanes, silicate esters, and metal alkoxides.

Next, the composite of the second silicon phases and the carbon source is heated to 700° C. to 1200° C. in an inert gas atmosphere (e.g., an atmosphere of argon, nitrogen, etc.) to carbonize the carbon source, to give formless carbon. In this way, a second silicon-containing material in which the second silicon phases are dispersed in a carbon phase containing formless carbon.

(ii) Second Method

Raw material silicon and a carbon source (hereinafter sometimes referred to as a second carbon material) are mixed, and using a pulverizer like a ball mill, the mixture of the raw material silicon and the carbon source, while being refined, is pulverized and formed into a composite. The mixture may be added with an organic solvent, and wet-pulverized. At this time, the raw material silicon is finely pulverized, to form second silicon phases. The second silicon phases are dispersed in a matrix of the second carbon material.

By forming the raw material silicon and the second carbon material into a composite as described above, a second silicon-containing material in which the second silicon phases are dispersed in the carbon phase of formless carbon is obtained. Thereafter, the second silicon-containing material may be heated to 700° C. to 1200° C. in an inert gas atmosphere.

As the second carbon material, formless carbon is preferred, and graphitizable carbon (soft carbon), non-graphitizable carbon (hard carbon), carbon black, and the like can be used. Examples of carbon black include acetylene black and Ketjen black. Even when graphite is used as the second carbon material, in the process of obtaining a composite of the second silicon and the carbon material using a pulverizer, a majority of the graphite crystal structure is lost, and a carbon phase of formless carbon can be formed.

Next, a secondary battery according to an embodiment of the present invention includes a positive electrode, a negative electrode, an electrolyte, and a separator interposed between the positive electrode and the negative electrode. The negative electrode includes a first carbon material, a first silicon-containing material, and a second silicon-containing material. A description will be given below of the negative electrode, the positive electrode, the electrolyte, and the separator included in the secondary battery according to an embodiment of the present invention.

[Negative Electrode]

The negative electrode includes, for example, a negative electrode current collector, and a negative electrode mixture layer formed on a surface of the negative electrode current collector and containing a negative electrode active material. The negative electrode mixture layer can be formed by applying a negative electrode slurry of a negative electrode mixture dispersed in a dispersion medium onto a surface of the negative electrode current collector, followed by drying. The applied film after drying may be rolled, if necessary.

The negative electrode mixture contains a negative electrode active material including the aforementioned silicon-containing material as an essential component, and can contain a binder, a conductive agent, a thickener, and the like, as optional components. The negative electrode active material includes the first carbon material and the first and second silicon-containing materials.

Examples of the negative electrode current collector include a non-porous conductive substrate (e.g., metal foil) and a porous conductive substrate (e.g., mesh, net, punched sheet). The negative electrode current collector may be made of, for example, stainless steel, nickel, a nickel alloy, copper, or a copper alloy.

Examples of the binder include fluorocarbon resin, polyolefin resin, polyamide resin, polyimide resin, vinyl resin, styrene-butadiene copolymer rubber (SBR), polyacrylic acid and derivatives thereof. These may be used singly or in combination of two or more kinds.

Examples of the conductive agent include carbon black, conductive fibers, fluorinated carbon, and organic conductive materials. These may be used singly or in combination of two or more kinds.

Examples of the thickener include carboxymethyl cellulose (CMC), and polyvinyl alcohol. These may be used singly or in combination of two or more kinds.

Examples of the dispersion medium include water, alcohols, ethers, N-methyl-2-pyrrolidone (NMP), and mixed solvents of these.

[Positive Electrode]

The positive electrode includes, for example, a positive electrode current collector, and a positive electrode mixture layer formed on a surface of the positive electrode current collector. The positive electrode mixture layer can be formed by applying a positive electrode slurry of a positive electrode mixture dispersed in a dispersion medium onto a surface of the positive electrode current collector, followed by drying. The applied film after drying may be rolled, if necessary.

The positive electrode mixture includes a positive electrode active material as an essential component, and may further include a binder, a conductive agent, and the like, as optional components.

The positive electrode active material may be a lithium composite metal oxide. Examples of the lithium composite metal oxide include $Li_aCoO_2$, $Li_aNiO_2$, $Li_aMnO_2$, $Li_a Co_bNi_{1-b}O_2$, $Li_aCo_bM_{1-b}O_c$, $Li_aNi_{1-b}M_bO_c$, $Li_aMn_2O_4$, $Li_aMn_{2-b}MbO_4$, $LiMePO_4$, $Li_2MePO_4F$. Here, M represents at least one selected from Na, Mg, Sc, Y, Mn, Fe, Co, Ni, Cu, Zn, Al, Cr, Pb, Sb, and B. Me includes at least one transition element (e.g., at least one selected from the group consisting of Mn, Fe, Co, and Ni). Here, $0 \leq a \leq 1.2$, $0 \leq b \leq 0.9$, and $2.0 \leq c \leq 2.3$. The value a representing the molar ratio of lithium is a value immediately after the preparation of the active material and is subjected to increase and decrease during charge and discharge.

Examples of the binder and the conductive agent may be like those exemplified for the negative electrode. Additional examples of the conductive agent include graphite, such as natural graphite and artificial graphite.

For the positive electrode current collector, a conductive substrate conforming to the negative electrode current collector can be used. The positive electrode current collector may be made of, for example, stainless steel, aluminum, an aluminum alloy, and titanium.

[Electrolyte]

The electrolyte (or liquid electrolyte) contains a solvent, and a lithium salt dissolved in the solvent. The concentration of the lithium salt in the electrolyte is, for example, 0.5 to 2 mol/L. The electrolyte may contain a commonly known additive.

The solvent may be aqueous or non-aqueous. The non-aqueous solvent may be, for example, a cyclic carbonic acid ester, a chain carbonic acid ester, or a cyclic carboxylic acid ester. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). The non-aqueous solvent may be used singly, or in combination of two or more kinds.

Examples of the lithium salt include a lithium salt of a chlorine-containing acid (e.g., $LiClO_4$, $LiAlCl_4$, $LiB_{10}Cl_{10}$), a lithium salt of a fluorine-containing acid (e.g., $LiPF_6$, $LiBF_4$, $LiSbF_6$, $LiAsF_6$, $LiCF_3SO_3$, $LiCF_3CO_2$), a lithium salt of a fluorine-containing acid imide (e.g., $LiN(CF_3SO_2)_2$, $LiN(CF_3SO_2)(C_4F_9SO_2)$, $LiN(C_2F_5SO_2)_2$), and a lithium halide (e.g., LiCl, LiBr, LiI). The lithium salt may be used singly or in combination of two or more kinds.

[Separator]

It is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

The secondary battery, for example, has a structure in which an electrode group formed by winding the positive electrode and the negative electrode with the separator interposed therebetween is housed in an outer body, together with the electrolyte. The wound-type electrode group may be replaced with a different form of electrode group, for example, a stacked-type electrode group formed by stacking the positive electrode and the negative electrode with the separator interposed therebetween. The secondary battery may be in any form, such as cylindrical type, prismatic type, coin type, button type, or laminate type.

Figure 2:
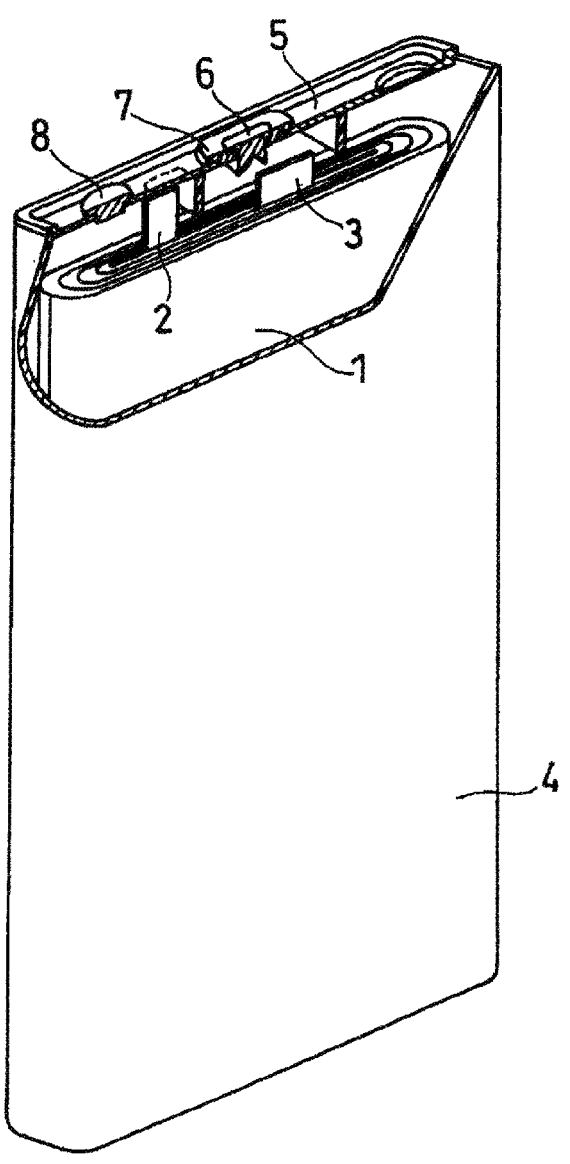
FIG. 2 A schematic partially cut-away schematic oblique view of a secondary battery according to one embodiment of the present invention.

FIG. 2 is a schematic partially cut-away oblique view of a prismatic secondary battery according to one embodiment of the present invention.

The battery includes a bottomed prismatic battery case 4, and an electrode group 1 and an electrolyte (not shown) housed in the battery case 4, and a sealing plate 5 sealing the opening of the battery case 4. The electrode group 1 has a long negative electrode, a long positive electrode, and a separator interposed therebetween. The sealing plate 5 has a liquid inlet closed with a sealing plug 8, and a negative electrode terminal 6 insulated from the sealing plate 5 by a gasket 7.

A negative electrode lead 3 is attached at its one end to the negative electrode current collector, by means of welding or the like. A positive electrode lead 2 is attached at its one end to the positive electrode current collector, by means of welding or the like. The negative electrode lead 3 is electrically connected at its other end to the negative electrode terminal 6. The positive electrode lead 2 is electrically connected at its other end to the sealing plate 5.

The present disclosure will be specifically described below with reference to Examples and Comparative Examples. It is to be noted, however, the present invention is not limited to the following Examples.

Example 1

[Preparation of First Silicon-Containing Material]

Silicon dioxide and lithium carbonate were mixed in an atomic ratio: Si/Li of 1.05, and the mixture was baked at 950° C. in air for 10 hours, to obtain a lithium silicate represented by the formula: $Li_2Si_2O_5$ where z=0.5. The obtained lithium silicate was pulverized to have an average particle diameter of 10 μm.

Lithium silicate ($Li_2Si_2O_5$) having an average particle diameter of 10 μm and raw material silicon (3N, average particle diameter: 10 μm) were mixed in a mass ratio of 70:30. The mixture was packed into a pot (made of SUS, volume: 500 mL) of a planetary ball mill (P-5, available from Fritsch Co., Ltd.). Then, 24 SUS balls (diameter: 20 mm) were put in the pot, and with the lid closed, the mixture was pulverized at 200 rpm for 50 hours.

Next, the powdery mixture was taken out in an inert atmosphere, and baked at 800° C. for 4 hours in an inert atmosphere under application of pressure by a hot press machine, to obtain a sintered body of the mixture (a silicon-silicate composite).

Thereafter, the silicon-silicate composite was pulverized and passed through a 40-μm mesh, and then, the resultant silicate composite particles were mixed with coal pitch (MCP 250, available from JFE Chemical Corporation). The mixture was baked at 800° C. in an inert atmosphere, to coat the silicate composite particles with carbon, to form a conductive layer. The coating amount of the carbon was set to 5 mass %, relative to the total mass of the silicate composite particles and the conductive layers. Thereafter, using a sieve, silicate composite particles of 10 μm in average particle diameter having a conductive layer (first silicon-containing particles) were obtained.

Here, the volume-based particle size distribution of the first silicon-containing particles was measured using a laser diffraction particle diameter distribution analyzer (MT3300EXII, available from Microtrac Inc.), and the particle diameter at 50% cumulative volume was determined as the average particle diameter.

The crystallite size of the first silicon phase calculated by the Scherrer formula, from a diffraction peak attributed to the Si (111) plane in the XRD analysis of the silicate composite particles was 15 nm.

The composition of the lithium silicate phase was analyzed by the above-described method (ICP-AES). The result found that the Si/Li ratio was 1.0, and the content of $Li_2Si_2O_5$ measured by Si-NMR was 70 mass % (the content of first silicon phases was 30 mass %).

[Preparation of Second Silicon-Containing Material]

Coal pitch (MCP250, available from JFE Chemical Corporation) serving as a carbon source and raw material silicon (3N, average particle diameter: 10 μm) were mixed in a mass ratio of 50:50. The mixture was packed into a pot (made of SUS, volume: 500 mL) of a planetary ball mill (P-5, available from Fritsch Co., Ltd.). Then, 24 SUS balls (diameter: 20 mm) were put in the pot, and with the lid closed, the mixture was pulverized at 200 rpm for 50 hours. A composite of second silicon phases and the carbon source was thus obtained.

Next, the composite of the second silicon phases and the carbon source was baked in an inert gas atmosphere, to carbonize the carbon source, to give a second silicon-containing material in which the second silicon phases were dispersed in a carbon phase including formless carbon. Thereafter, using a jet mill, second silicon-containing particles having an average particle diameter of 10 μm were obtained.

Here, the volume-based particle size distribution of the second silicon-containing particles was measured using a laser diffraction particle diameter distribution analyzer (MT3300EXII, available from Microtrac Inc.), and the particle diameter at 50% cumulative volume was determined as the average particle diameter.

The crystallite size of the second silicon phase calculated by the Scherrer formula, from a diffraction peak attributed to the Si (111) plane in the XRD analysis of the second silicon-containing particles was 15 nm.

<Particle Fracture Strength>

The particle fracture strength of the obtained first silicon-containing material or second silicon-containing material was measured. First, 10 particles whose particle diameter obtained in a photographed image was 5 μm or more and 20 μm or less were prepared for each material. Under a gradually increasing load, the particle was compressed with a flat indenter having a tip diameter of 50 μm, with the displacement rate set at 5 μm/sec, to determine the load at which the particle fractures. As a micro-compression tester, MCT-211 available from Shimadzu Corporation was used. The particle fracture strengths of 10 particles were measured and averaged.

[First Carbon Material]

Spherical graphite having an average particle diameter Dc of 20 μm was prepared. Here, the volume-based particle size distribution of the graphite was measured using a laser diffraction particle diameter distribution analyzer (MT3300EXII, available from Microtrac Inc.), and the particle diameter at 50% cumulative volume was determined as the average particle diameter.

[Production of Negative Electrode]

The first silicon-containing particles having a conductive layer, the second silicon-containing particles, and graphite were mixed in a mass ratio of 3:3:94, and used as a negative electrode active material. The negative electrode active material, sodium carboxymethylcellulose (CMC-Na), and styrene-butadiene rubber (SBR) were mixed in a mass ratio of 97.5:1:1.5, to which water was added. The mixture was stirred in a mixer (T.K. HIVIS MIX, available from PRIMIX Corporation), to prepare a negative electrode slurry.

Next, the negative electrode slurry was applied onto a surface of copper foil, so that the mass of the negative electrode mixture per 1 $m^2$ was 190 g. The applied film was dried, then rolled. A negative electrode in which a negative electrode mixture layer having a density of 1.5 $g/cm^3$ was formed on both sides of the copper foil was thus obtained.

[Production of Positive Electrode]

A lithium nickel composite oxide ($LiNi_{0.8}Co_{0.18}Al_{0.02}O_2$), acetylene black, and polyvinylidene fluoride were mixed in a mass ratio of 95:2.5:2.5, to which N-methyl-2-pyrrolidone (NMP) was added. The mixture was stirred in a mixer (T.K. HIVIS MIX, available from PRIMIX Corporation), to prepare a positive electrode slurry. Next, the positive electrode slurry was applied onto a surface of aluminum foil. The applied film was dried, then rolled. A positive electrode in which a positive electrode mixture layer having a density of 3.6 $g/cm^3$ was formed on both sides of the aluminum foil was thus obtained.

[Preparation of Liquid Electrolyte]

A liquid electrolyte was prepared by dissolving a lithium salt in a non-aqueous solvent. The non-aqueous solvent used here was a mixed solvent containing ethylene carbonate (EC), dimethyl carbonate (DMC) and methyl acetate (MA) in a volume ratio of 20:40:40. The concentration of $LiPF_6$ in the liquid electrolyte was set to 1.0 mol/L.

[Fabrication of Secondary Battery]

The positive electrode and the negative electrode, with a tab attached to each electrode, were wound spirally with a separator interposed therebetween such that the tabs were positioned at the outermost layer, thereby to form an electrode group. The electrode group was inserted into an outer body made of aluminum laminate film and dried under vacuum at 105° C. for 2 hours. The liquid electrolyte was injected, and the opening of the outer body was sealed. A secondary battery A1 was thus obtained.

Examples 2 to 4 and Comparative Examples 1 to 3

Except for using a negative electrode active material having a composition as shown in Table 1, in the same manner as in Example 1, batteries A2, A3, and A4 of Examples 2, 3, and 4 and batteries B1, B2, and B3 of Comparative Examples 1, 2 and 3 were fabricated. In Table 1 (and Tables 2 and 3 below), the first silicon-containing material is indicated as first Si material, and the second silicon-containing material is indicated as second Si material. In Battery A4, the particle fracture strength Mb was controlled by changing the baking temperature.

[Evaluation]

The batteries fabricated above were each evaluated in the following manner.

For each battery after fabrication, a constant-current charging was performed at a current of 0.3 It until the voltage reached 4.2 V, and then, a constant-voltage charging was performed at a constant voltage of 4.2 V until the current reached 0.015 It. Thereafter, a constant-current discharging was performed at a current of 0.3 It until the voltage reached 2.75 V. The rest period between charging and discharging was set to 10 minutes. The charging and discharging were performed in a 25° C. environment.

Note that (1/X) It represents a current, and (1/X) It (A)=Rated capacity (Ah)/X (h), where X represents the time taken for charging or discharging electricity equivalent to the rated capacity. For example, 0.5 It means that X=2, and the current value is equal to the rated capacity (Ah) divided by 2 (h).

The charging and discharging were repeated under the above charge-discharge conditions. The ratio (percentage) of a discharge capacity at the 300th cycle to a discharge capacity at the 1st cycle was determined as a capacity retention ratio in charge-discharge cycles. The evaluation results are shown in Table 1, together with the information on the particle fracture strength.

TABLE 1

| Battery | Graphite (mass %) | First Si material (mass %) | Ma (MPa) | Second Si material (mass %) | Mb (MPa) | B/A | (A + B)/ (A + B + C) (%) | Mb/Ma | Cycle life |
|---|---|---|---|---|---|---|---|---|---|
| A1 | 94 | 3 | 716 | 3 | 487 | 1.0 | 6 | 0.680 | 110 |
| A2 | 91 | 3 | 716 | 6 | 487 | 2.0 | 9 | 0.680 | 106 |
| A3 | 91 | 6 | 716 | 3 | 487 | 0.5 | 9 | 0.680 | 104 |
| A4 | 94 | 3 | 716 | 3 | 268 | 1 | 6 | 0.374 | 102 |
| B1 | 94 | 0 | — | 6 | 487 | — | 6 | — | 98 |
| B2 | 94 | 6 | 716 | 0 | — | 0 | 6 | — | 100 |
| B3 | 91 | 9 | 716 | 0 | — | 0 | 9 | — | 90 |

Table 1 shows that when the first silicon-containing material was used alone in combination with graphite (batteries B2 and B3), the use of the first silicon-containing material was restricted to a small amount in order to maintain the cycle characteristics. Even when the first silicon-containing material occupied 9 mass % of the negative electrode active material, the cycle life was much lower than when occupying 6 mass % of the negative electrode active material (B2). On the other hand, when graphite and the first and second silicon-containing materials were used in combination, the cycle characteristics were improved as compared to when the first silicon-containing material was used alone (B2). Even when the total amount of the first and second silicon-containing materials occupying the negative electrode active material was 9 mass % (A2, A3), the cycle characteristics were improved as compared to when the first silicon-containing material was used alone (B2). In the battery A1 in which the B/A ratio was 1.0, most excellent cycle characteristics were obtained.

Examples 5 to 7 and Comparative Examples 4 and 5

Except for using a negative electrode active material having a composition as shown in Table 2, in the same manner as in Example 1, batteries A5, A6, and A7 of Examples 5, 6, and 7 and batteries B4 and B5 of Comparative Examples 4 and 5 were fabricated, and evaluated in the same manner. Here, the particle fracture strength Ma was controlled by the hot-pressing pressure, and the Mb was controlled by the baking temperature.

TABLE 2

| Battery | Graphite (mass %) | First Si material (mass %) | Ma (MPa) | Second Si material (mass %) | Mb (MPa) | B/A | (A + B)/ (A + B + C) (%) | Mb/Ma | Cycle life |
|---|---|---|---|---|---|---|---|---|---|
| A5 | 88 | 2 | 647 | 10 | 381 | 5 | 12 | 0.590 | 106 |
| A6 | 89 | 5 | 647 | 6 | 381 | 1.2 | 11 | 0.590 | 106 |
| A7 | 90 | 4 | 647 | 6 | 381 | 1.5 | 10 | 0.590 | 107 |

TABLE 2-continued

| Battery | Graphite (mass %) | First Si material (mass %) | Ma (MPa) | Second Si material (mass %) | Mb (MPa) | B/A | (A + B)/ (A + B + C) (%) | Mb/Ma | Cycle life |
|---|---|---|---|---|---|---|---|---|---|
| B4 | 87 | 0 | — | 13 | 381 | — | 13 | — | 99 |
| B5 | 90 | 10 | 647 | 0 | — | 0 | 10 | — | 100 |

Examples 8 and 9 and Comparative Examples 6 and 7

Except for using a negative electrode active material having a composition as shown in Table 3, in the same manner as in Example 1, batteries A8 and A9 of Examples 8 and 9 and batteries B6 and B7 of Comparative Examples 6 and 7 were fabricated, and evaluated in the same manner. Here, the particle fracture strength Ma was controlled by the hot-pressing pressure, and the Mb was controlled by the baking temperature.

TABLE 3

| Battery | Graphite (mass %) | First Si material (mass %) | Ma (MPa) | Second Si material (mass %) | Mb (MPa) | B/A | (A + B)/ (A + B + C) (%) | Mb/Ma | Cycle life |
|---|---|---|---|---|---|---|---|---|---|
| A8 | 76 | 5 | 682 | 19 | 712 | 3.8 | 24 | 1.044 | 106 |
| A9 | 82 | 3 | 446 | 15 | 712 | 5.0 | 18 | 1.597 | 105 |
| B6 | 77 | 0 | — | 23 | 712 | — | 23 | — | 99 |
| B7 | 80 | 20 | 446 | 0 | — | 0 | 20 | — | 100 |

Tables 2 and 3 show that even when the composition of the negative electrode active material was changed variously, excellent cycle characteristics can be obtained when graphite and the first and second silicon-containing materials were used in combination.

INDUSTRIAL APPLICABILITY

A secondary battery according to the present invention is useful as a main power supply for mobile communication equipment, portable electronic equipment, and other similar devices.

REFERENCE SIGNS LIST

1: electrode group, 2: positive electrode lead, 3: negative electrode lead, 4: battery case, 5: sealing plate, 6: negative electrode terminal, 7: gasket, 8: sealing plug, 20: silicate composite particle coated with conductive layer, 21: lithium silicate phase, 22: first silicon phase, 23: silicate composite particle, 26: conductive layer

The invention claimed is:

1. A secondary battery, comprising:
a positive electrode; a negative electrode; and an electrolyte, wherein
the negative electrode includes a carbon material, a first silicon-containing material, and a second silicon-containing material,
the first silicon-containing material includes a silicate phase, and first silicon phases dispersed in the silicate phase, and
the second silicon-containing material includes a carbon phase, and second silicon phases dispersed in the carbon phase, and the second silicon-containing material is free of silicate phase.

2. The secondary battery according to claim 1, wherein a ratio: B/A of a mass B of the second silicon-containing material to a mass A of the first silicon-containing material satisfies $0.2 < B/A < 10$.

3. The secondary battery according to claim 1, wherein a ratio of a total of the mass A of the first silicon-containing material and the mass B of the second silicon-containing material, to a total of the mass A of the first silicon-containing material, the mass B of the second silicon-containing material, and a mass C of the carbon material is 5 mass % or more and 30 mass % or less.

4. The secondary battery according to claim 1, wherein the silicate phase contains at least one selected from the group consisting of an alkali metal element and a Group II element.

5. The secondary battery according to claim 4, wherein the silicate phase further contains an element M, and the element M is at least one selected from the group consisting of B, Al, Zr, Nb, Ta, V, La, Y, Ti, P, Bi, Zn, Sn, Pb, Sb, Co, Er, F, and W.

6. The secondary battery according to claim 4, wherein the silicate phase includes a lithium silicate represented by a formula: $Li_{2z}SiO_{2+z}$ where $0 < z < 2$.

7. The secondary battery according to claim 1, wherein a particle fracture strength Ma of the first silicon-containing material is $300\ MPa < Ma < 1000\ MPa$.

8. The secondary battery according to claim 1, wherein a particle fracture strength Mb of the second silicon-containing material is $300\ MPa < Mb < 1000\ MPa$.

9. The secondary battery according to claim 8, wherein a ratio: Mb/Ma of the particle fracture strength Mb of the second silicon-containing material to the particle fracture strength Ma of the first silicon-containing material satisfies $0.5 < Mb/Ma < 2$.

10. A secondary battery, comprising:
a positive electrode; a negative electrode; and an electrolyte, wherein
the negative electrode includes a carbon material, a first silicon-containing material, and a second silicon-containing material,
the first silicon-containing material includes a silicate phase, and first silicon phases dispersed in the silicate phase, and
the second silicon-containing material includes a carbon phase, and second silicon phases dispersed only in the carbon phase.

\* \* \* \* \*